(12) United States Patent
Pyper et al.

(10) Patent No.: US 9,302,311 B2
(45) Date of Patent: Apr. 5, 2016

(54) GUIDE PIN HEAD

(71) Applicant: Standard Lifters, Inc., Grand Rapids, MI (US)

(72) Inventors: Joel T. Pyper, Grand Rapids, MI (US); Scott M. Breen, Marne, MI (US)

(73) Assignee: STANDARD LIFTERS, INC., Grand Rapids, MI (US)

( * ) Notice: Subject to any disclaimer, the term of this patent is extended or adjusted under 35 U.S.C. 154(b) by 0 days.

(21) Appl. No.: 14/549,717

(22) Filed: Nov. 21, 2014

(65) Prior Publication Data

US 2015/0196947 A1    Jul. 16, 2015

Related U.S. Application Data

(60) Provisional application No. 61/907,421, filed on Nov. 22, 2013.

(51) Int. Cl.

| | |
|---|---|
| *B21D 37/12* | (2006.01) |
| *B21D 53/30* | (2006.01) |
| *B21D 26/045* | (2011.01) |
| *B21D 26/041* | (2011.01) |
| *B21D 37/14* | (2006.01) |
| *B23P 15/24* | (2006.01) |

(52) U.S. Cl.
CPC .............. *B21D 37/12* (2013.01); *B21D 26/041* (2013.01); *B21D 26/045* (2013.01); *B21D 37/14* (2013.01); *B21D 53/30* (2013.01); *B23P 15/24* (2013.01); *Y10T 29/49947* (2015.01)

(58) Field of Classification Search
CPC ...... B21D 37/12; B21D 26/04; B21D 26/045; B21D 53/30
USPC .......................................................... 72/456
See application file for complete search history.

(56) References Cited

U.S. PATENT DOCUMENTS

| | | |
|---|---|---|
| 2,487,233 A | 11/1949 | Gerke |
| 2,663,180 A | 12/1953 | Benedict |
| 3,126,922 A | 3/1964 | Randlett et al. |
| 3,190,703 A | 6/1965 | Thomson et al. |
| 3,474,656 A | 10/1969 | Kraft |
| 3,514,166 A | 5/1970 | Coley |
| 4,036,056 A | 7/1977 | Saunders |
| 4,135,770 A | 1/1979 | Doherty et al. |
| 4,199,313 A | 4/1980 | Bohnenberger |
| 4,483,173 A | 11/1984 | Duhamel |
| 4,696,180 A | 9/1987 | Zandel |
| 4,732,033 A | 3/1988 | Smedberg et al. |
| 4,742,746 A | 5/1988 | Olsson |
| 4,796,460 A | 1/1989 | Smedberg et al. |
| 4,900,017 A | 2/1990 | Bold, Jr. |
| 4,926,563 A | 5/1990 | Smith |
| RE33,940 E | 5/1992 | Matsuo |

(Continued)

*Primary Examiner* — David B Jones
(74) *Attorney, Agent, or Firm* — Price Heneveld LLP (57) ABSTRACT

A guide pin assembly for metal forming dies includes a cylindrical guide pin body with a tapered guide pin head to guide associated die members from converging and diverging positions. A base is used to secure the guide pin assembly to one of the die members in a reciprocating die. The base includes a tapered surface that coincides with the tapered surface of the guide pin head to transfer the directional force, caused by the diverging die members, on the guide pin assembly to other die components. The guide pin assembly includes additional dampening components between the guide pin assembly and the base to dampen the impact caused by the diverging die members.

20 Claims, 4 Drawing Sheets

(56) References Cited

U.S. PATENT DOCUMENTS

| | | |
|---|---|---|
| 5,113,736 A | 5/1992 | Meyerle |
| 5,245,904 A | 9/1993 | Meyerle |
| 5,328,276 A | 7/1994 | Linteau |
| 5,397,135 A | 3/1995 | Smith |
| 5,722,280 A | 3/1998 | Bodnar |
| 5,758,374 A | 6/1998 | Ronci |
| 5,788,903 A | 8/1998 | Allgaier |
| 6,220,946 B1 | 4/2001 | Arnold |
| 6,408,728 B1 | 6/2002 | Tsuji et al. |
| 6,755,104 B2 | 6/2004 | Grant |
| 6,848,290 B2 | 2/2005 | Pyper et al. |
| 6,925,922 B2 | 8/2005 | Manabe et al. |
| 6,986,273 B2 | 1/2006 | Rager |
| 7,000,446 B2 | 2/2006 | Nieschulz et al. |
| 7,004,007 B2 | 2/2006 | Kruger et al. |
| 7,114,365 B2 | 10/2006 | Rooney, Jr. et al. |
| 7,152,451 B1 | 12/2006 | Cotter |
| 7,326,092 B2 | 2/2008 | Fedder et al. |
| 7,730,757 B2 | 6/2010 | Pyper et al. |
| 7,950,262 B2 | 5/2011 | Pyper et al. |
| 8,074,486 B1 | 12/2011 | Pyper et al. |
| 8,074,515 B2 | 12/2011 | Van Kann et al. |
| 8,151,619 B2 | 4/2012 | Pyper et al. |
| 8,291,603 B2 | 10/2012 | Saegesser et al. |
| 8,616,038 B2 | 12/2013 | Breen et al. |
| 8,939,005 B2 * | 1/2015 | Breen .................. B21D 37/12 72/456 |
| 2009/0193865 A1 | 8/2009 | Pyper et al. |
| 2011/0192206 A1 | 8/2011 | Cotter |
| 2011/0296893 A1 | 12/2011 | Breen et al. |
| 2011/0302988 A1 | 12/2011 | Breen et al. |
| 2012/0055224 A1 | 3/2012 | Breen et al. |
| 2012/0055226 A1 | 3/2012 | Breen et al. |

* cited by examiner

GUIDE PIN HEAD

CLAIM OF PRIORITY

The present application is related to commonly assigned, co-pending U.S. provisional patent application Ser. No. 61/907,421, filed Nov. 22, 2013, entitled GUIDE PIN HEAD, which is incorporated herein by reference, and claims priority thereto under 35 U.S.C. §119.

BACKGROUND OF THE INVENTION

The present invention relates to metal forming dies and the like, and in particular to a guide pin assembly incorporating a unique guide pin construction with a tapered head.

Metal forming dies, such as stamping dies and the like, are well known in the art. Progressive metal forming dies are unique, very sophisticated mechanisms which have multiple stations or progressions that are aligned longitudinally, and are designed to perform a specified operation at each station in a predetermined sequence to create a finished metal part. Progressive stamping dies are capable of forming complex metal parts at very high speeds, so as to minimize manufacturing costs.

Heretofore, the dies used in metal forming presses have typically been individually designed, one of a kind assemblies for a particular part, with each of the various components being handcrafted and custom mounted or fitted in an associated die set, which is in turn positioned in a stamping press. Not only are the punches and the other forming tools in the die set individually designed and constructed, but the other parts of the die set, such as stock lifters, guides, end caps and keepers, cam returns, etc., are also custom designed and installed in the die set. Current die making processes require carefully machined, precision holes and recesses in the die set for mounting the individual components, such that the same are quite labor intensive, and require substantial lead time to make, test and set up in a stamping press. Consequently, such metal forming dies are very expensive to design, manufacture, and repair or modify.

Recently, some components for metal forming dies have been pre-constructed using a modular design that is installed in a die set as a complete unit, instead of custom making each of the component parts and assembling them in the die set. One such modular die component is a guided keeper assembly, which is the subject of U.S. Pat. Nos. 7,730,757; 7,950,262; 8,074,486; 8,151,619; and 8,616,038 published U.S. Application Publication Nos. 2011/0302988, 2012/0055224, and 2012/0055226; and others, which are hereby incorporated herein by reference, and have met with substantial commercial success in reducing the overall cost of manufacturing metal forming dies. While such modular components are very advantageous, further improvements to reduce the manufacturing costs of metal forming dies generally, as well as such modular components, and improve quality and strength would clearly be advantageous. Hence, a guide pin assembly construction and associated method which simplifies the manufacturing process, reduces lead time and inventories, and minimize manufacturing costs, as well as improved performance, would clearly be advantageous.

SUMMARY OF THE INVENTION

One aspect of the present invention is a guide pin assembly for metal forming dies having first and second die members which mutually converge and diverge to form metal parts. The guide pin assembly includes a guide pin body having a generally cylindrical shape, with a first end portion configured for secure operable attachment with the first die member a second end portion disposed generally opposite said first end portion, and configured to be received into an associated aperture in the second die member. The guide pin body also has a medial portion disposed between the first and second end portions, having a generally hard, smooth finished exterior surface for precisely guiding the converging and diverging motion between the first and second die members. The guide pin body has a first groove extending circumferentially about the exterior surface at an axial location disposed generally adjacent to the second end portion of the guide pin body. The groove has a generally arcuate shape that opens radially outwardly. The guide pin assembly has a guide pin head with a first end portion having a tapered outer sidewall. The guide pin head has a second end portion with a first generally cylindrical outer sidewall having a first diameter and a second generally cylindrical sidewall having a second diameter that is larger than the first diameter, such that an annular shoulder is formed on the outside of the second end portion of the guide pin head. An aperture extends through the guide pin head. The aperture has a first generally cylindrical inner sidewall with a first diameter and a second generally cylindrical sidewall with a second diameter that is greater than the first diameter, such that an annular shoulder is formed on the inside of the guide pin head. The guide pin head has a groove extending circumferentially about the exterior surface of the first generally cylindrical outer sidewall of the second end portion of the guide pin head. The guide pin assembly includes a retainer ring closely received and retained in the first groove in the guide pin body, that contacts the annular shoulder on the inside of the guide pin head to retain the guide pin head on the guide pin body.

Yet another aspect of the present invention is a metal forming die having first and second die members which mutually converge and diverge to form metal part using a guide pin assembly. The guide pin assembly includes a guide pin body having a generally cylindrical shape, with a first end portion configured for secure operable attachment with the first die member a second end portion disposed generally opposite said first end portion, configured to be received into an associated aperture in the second die member. The guide pin body also has a medial portion disposed between the first and second end portions, having a generally hard, smooth finished exterior surface for precisely guiding the converging and diverging motion between the first and second die members. The guide pin body has a first groove extending circumferentially about the exterior surface at an axial location disposed generally adjacent to the second end portion of the guide pin body. The groove has a generally arcuate shape that opens radially outwardly. The guide pin assembly has a guide pin head with a first end portion having a tapered outer sidewall. The guide pin head has a second end portion with a first generally cylindrical outer sidewall having a first diameter and a second generally cylindrical sidewall having a second diameter that is larger than the first diameter, such that an annular shoulder is formed on the outside of the second end portion of the guide pin head. An aperture extends through the guide pin head. The aperture has a first generally cylindrical inner sidewall with a first diameter and a second generally cylindrical sidewall with a second diameter that is greater than the first diameter, such that an annular shoulder is formed on the inside of the guide pin head. The guide pin head has a groove extending circumferentially about the exterior surface of the first generally cylindrical outer sidewall of the second end portion of the guide pin head. The guide pin assembly includes a retainer ring closely received and retained in the first groove in the guide pin body, that contacts the annular shoulder on the inside of the guide pin head to retain the guide pin head on the guide pin body.

Yet another aspect of the present invention is a method for making a guide pin assembly for metal forming dies of the type having first and second die members which mutually converge and diverge to form metal parts. The method includes forming a guide pin body having a generally cylindrical shape. The guide pin body also has a first end portion configured for secure operable attachment with the first die member and a second end portion disposed generally opposite said first end portion, configured to be received into an associated aperture in the second die member. The guide pin body has a medial portion disposed between said first and second end portions, with a generally hard, smooth finished exterior surface for precisely guiding the converging and diverging motion between the first and second die members. The guide pin body forming step includes forming a first groove extending circumferentially about the exterior surface at an axial location disposed generally adjacent to the second end portion of the guide pin body, and having a generally arcuate shape that opens radially outwardly. The method also includes forming a guide pin head. The guide pin head has a first end portion with a tapered outer sidewall. The guide pin head also has a second end portion with a first generally cylindrical outer sidewall having a first diameter and a second generally cylindrical sidewall having a second diameter that is larger than the first diameter, such that an annular shoulder is formed on the outside of the second end portion. The guide pin head forming step includes forming an aperture that extends through the guide pin head, having a first generally cylindrical inner sidewall having a first diameter and a second generally cylindrical sidewall having a second diameter that is greater than the first diameter, such that an annular shoulder is formed on the inside of the guide pin head. The guide pin head forming step includes forming a groove extending circumferentially about the exterior surface of the first generally cylindrical outer sidewall of the second end portion of the guide pin head. The method includes providing a retainer ring to be closely received and retained in the first groove in the guide pin body. The method includes sliding the guide pin head over the guide pin body and the retainer ring such that the guide pin head is retained on the guide pin body.

These and other advantages of the invention will be further understood and appreciated by those skilled in the art by reference to the following written specification, claims, and appended drawings.

DETAILED DESCRIPTION

For purposes of description herein, the terms "upper," "lower," "right," "left," "rear," "front," "vertical," "horizontal" and derivatives thereof shall relate to the invention as oriented in FIGS. 1-12. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 11:
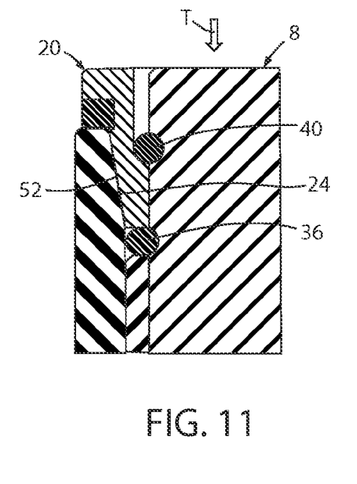
FIG. 11 is an enlarged fragmentary cross-sectional view of the guide pin assembly after complete contact, resulting in the compressed O-rings.
Figure 12:
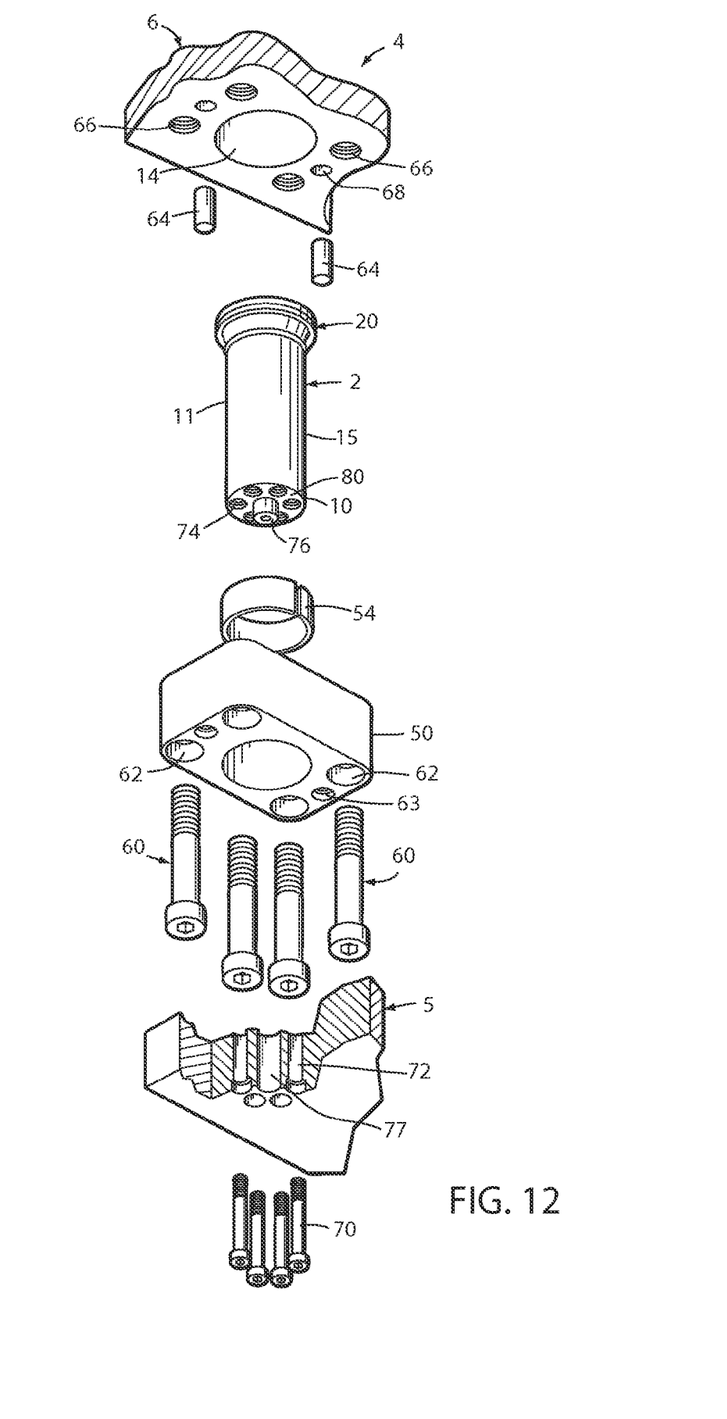
FIG. 12 is an exploded perspective view of the guide pin assembly shown in stalled in a guided keeper base between two associated die members.

The reference numeral 2 (FIGS. 1-5 and 7-12) generally designates a guide pin assembly embodying the present invention, which is particularly adapted for use in conjunction with metal forming dies, such as the die 4, selected portions of which are shown in FIG. 12, which has first and second die members 5 and 6, respectively, that mutually converge and diverge to form metal parts. Guide pin assembly 2 includes a guide pin body 8 having a generally cylindrical shape with a predetermined outside diameter. Guide pin body 8 includes a first end portion 10 configured for secure operable attachment with the first die member 5, and a second end portion 12, which is disposed generally opposite the first end portion 10, and is configured to be received into an associated aperture 14 in the second die member 6. The guide pin body 8 also includes a medial portion 11 disposed generally between the first and second end portions 10, 12, respectively, and having a generally hard, smooth, finished exterior surface 15 for precisely guiding the converging and diverging motion between the first and second die members 5 and 6. The guide pin body 8 also includes a first retainer groove 16, which extends circumferentially about the exterior surface 15 at an axial location disposed generally adjacent to the second end portion 12 of the guide pin body 8, and has a generally arcuate shape that opens radially outwardly. A second groove 18 also extends circumferentially about the exterior surface 15 at an axial location disposed between the first retainer groove 16 and the medial portion 11 of the guide pin body 8. The second groove 18 also has a generally arcuate shape that opens radially outwardly.

The guide pin assembly 2 also includes a guide pin head 20. The guide pin head 20 has a first end portion 21 and a second end portion 25. The first end portion 21 has a generally tapered sidewall 24 that gives the guide pin head 20 a generally conical outside surface at the first end portion 21. The second end portion 25 has a first generally cylindrical outer sidewall 31 and a second generally cylindrical outer sidewall 26. The diameter of the second outer sidewall 26 is larger than the diameter of the first outer sidewall 31 forming an annular shoulder 28. The guide pin head 20 also has an aperture 22 that extends through the guide pin head 20. The aperture 22 has a first generally cylindrical inner sidewall 33 and a second generally cylindrical inner sidewall 23. The second inner sidewall 23 has a diameter that is greater than the diameter of the first inner sidewall 33 resulting in an inner annular shoulder 29 in aperture 22 in the guide pin head 20. The diameter of the first cylindrical inner sidewall 33 is also substantially similar to the outside diameter of the guide in body 8 so that the first inner sidewall 33 is closely received on the outside of the guide pin body 8 when the guide pin assembly 2 is fully assembled. A groove 30 extends circumferentially about the exterior surface of the first outer sidewall 31 of the second end portion 25 of the guide pin head 20.

Figure 4:
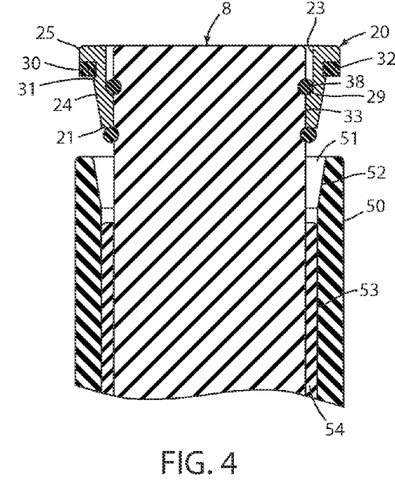
FIG. 4 is a fragmentary cross-sectional view of the guide pin assembly, including the associated base and bushing.
Figure 5:
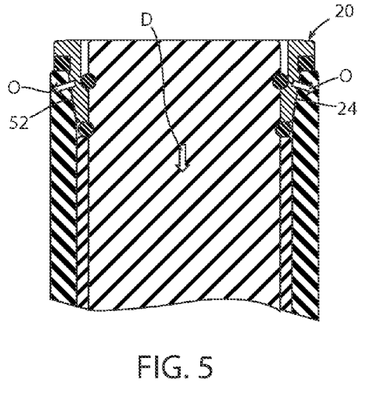
FIG. 5 is a fragmentary cross-sectional view of the guide pin assembly, shown in FIG. 4 with arrows showing the directional force when the die members diverge and the guide pin head engages the base.
Figure 7:
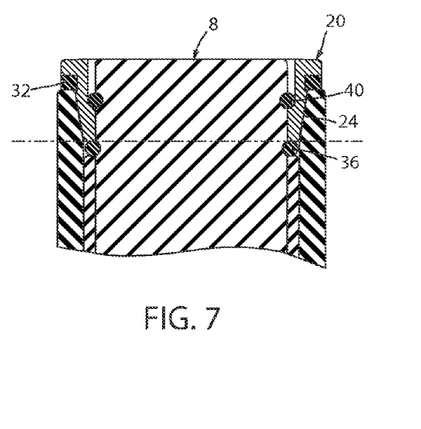
FIG. 7 is a fragmentary cross-sectional view of the guide pin assembly, shown in FIGS. 4 and 5, with a dashed line showing the retention area.

The guide pin assembly 2 also includes a first O-ring 32. This O-ring can have a square cross section as shown in FIGS. 1-5 and 7-12. The first O-ring 32 is received in the groove 30 in the guide pin head 20. The interior surface 37 of the first O-ring 32 can have a slightly smaller diameter than the inner diameter of the groove 30 such that the O-ring is slightly stretched to fit into the groove 30. As described below, the first O-ring 32 will provide a dampening feature as the guide pin assembly 2 contacts a base 50 when the die members 5, 6 diverge. The lower surface 34 of the first O-ring 32 will contact the base 50 and dampen the impact between the guide pin assembly 2 and the base 50. The guide pin assembly 2 also includes a second O-ring 36. The second O-ring 36 is received in the second groove 18 in the guide pin body 8. The interior surface 35 of the second O-ring 36 can have a slightly smaller diameter than the inner diameter of the second groove 18. Alternatively, the O-rings 34, 36 can also be sized to fit into the grooves without stretching the O-rings 34, 36. The exterior surface 37 of the second O-ring 36 should have an outside diameter such that it does not hinder the movement of the guide pin body 8 with respect to the base 50, as shown in FIGS. 5 and 7. As described below, this second O-ring 36 provides a dampening feature by dampening the impact between the lower surface 42 of the guide pin head 20 and the bushing 54 within the base 50. The O-rings 34, 36 can be made of any suitable flexible material. Examples of suitable material include rubber or other elastomeric material than can provide the dampening feature. Alternatively, a second retainer ring (not shown) can be used in place of the second O-ring 36. The second retainer ring would be sized to fit into the second groove 18. The second retainer ring would be used as an additional retention device to prevent the guide pin head 20 from sliding on the guide pin body 8. With such an arrangement, two retaining rings hold the guide pin head 20 on the guide pin body 8.

The guide pin assembly 2 also has a retainer ring 40 that can be a split metal C-ring. The retainer ring 40 has an inner surface 39 with a diameter to be closely received in the first groove 16 in the guide pin body 8. The retainer ring 40 retains the guide pin head 20 on the guide pin body 8 by contacting the inner shoulder 29 of the guide pin head 20. The close fit between the retainer ring 40, the first groove 16, and the inner shoulder 29 prevents the guide pin head 20 from shearing off as the die members 5, 6 diverge and the guide pin assembly 2 contacts the base 50.

Figure 3:
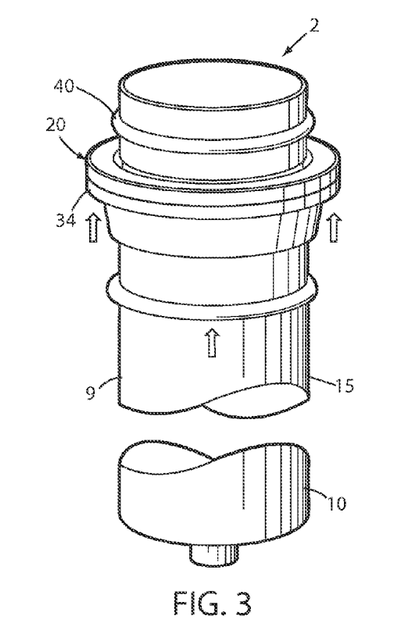
FIG. 3 is a fragmentary perspective view of the guide pin assembly in a partially assembled condition before the guide pin head is slid over the retainer ring.

FIG. 3 illustrates the method of securing the guide pin head 20 to the guide pin body 8. The retainer ring 40 is installed on groove 16 in the guide pin body 8. The first O-ring 32 is installed in the groove 30 on the guide pin head 20. The guide pin head 20 is then slid over the guide pin body 8 and the retainer ring 40 as shown by the arrows on FIG. 3. The second O-ring 36 is installed in groove 18 on the guide pin body 8. If a second retainer ring is used instead of the second O-ring 36, then the second retainer ring is installed in groove 18 after the guide pin head 20 has been slid over the first retainer ring 40.

Figure 8:
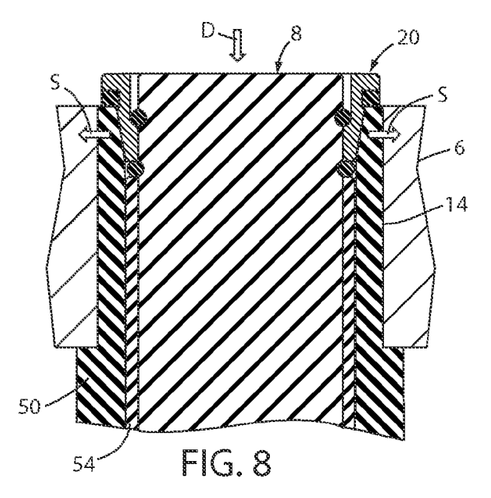
FIG. 8 is a fragmentary perspective view of a guide pin body assembly with a base showing the directional force and the support for the guide pin head.

A base 50 can be used to secure the guide pin assembly 2 to one of the die members 5, 6. As illustrated in FIGS. 4, 8, and 12, the base 50 can have a variety of shapes. All or part of the base 50 can be received in the aperture 14 in the second die member 6. For example, as illustrated in FIG. 8, a portion of the base 50 can be received in aperture 14. While FIG. 8 illustrates the base 50 extending through the entire aperture 14, the base 50 could also extend only partially into the aperture 14. Alternatively, as illustrated in FIG. 12, the base 50 can be attached to a surface of the die member 6, allowing only a portion of the guide pin assembly 2 to be received in the aperture 14.

Figure 10:
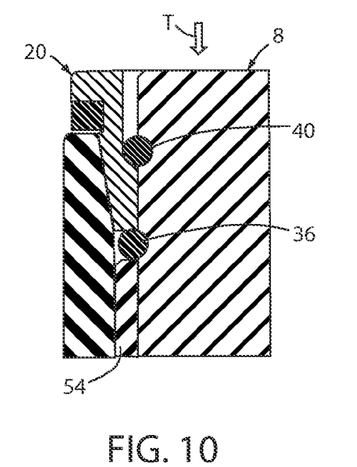
FIG. 10 is an enlarged fragmentary cross-sectional view of a guide pin assembly upon initial contact between the guide pin head and base.

In the illustrated example shown in FIG. 12, the base 50 connects the guide pin assembly 2 to the second die member 6. The guide pin head 20 and the second end portion 12 of the guide pin body 8 are received in a hole 14 in the second die member 6. The base 50 has a hole 51 with a generally flat cylindrical portion 53 that has a sidewall to closely receive the outer sidewall of the bushing 54. The hole 51 also has a tapered surface 52 that generally matches the tapered surface 24 of the guide pin head 20. As shown in FIGS. 10-11, the tapered surfaces 24, 52 contact when the die members 5, 6 diverge. As illustrated in FIG. 12, a plurality of fasteners 60 can be used to secure the base 50 to the second die member 6 through corresponding holes 62 in the base 50 and corresponding threaded apertures 66 in the second die member 6. In addition, dowels 64 may be used to help locate and secure the base 50 to the second die member 6 through holes 63 in the base 50 and holes 68 in the second die member 6. Similarly, a base 50 that extends into aperture 14 (FIG. 8) can be secured using fasteners (not shown) with associated holes in the base and second die member 6 (not shown).

The first end portion 10 of the guide pin body 8 can have a generally flat surface 80. A plurality of threaded holes 74 can be formed or drilled into the guide pin body 8. As illustrated in FIG. 12, the guide pin assembly 2 can be attached to the first die member 5 by the use of fasteners 70 that are received in holes 72 in the first die member 5 that correspond to the threaded holes 74 in the guide pin body 8. The holes 72 can have a shoulder to receive the heads of fasteners 70. A locating pin 76 can be formed on or attached to the guide pin body 8 to help locate the guide pin assembly 2 to a corresponding hole 77 in the first die member 5.

As will be appreciated by those having skill in the art of metal forming dies, metal forming dies typically incorporate multiple pairs of plates which converge and diverge relative to one another, and serve to either form the metal stock strip and/or advance the stock strip through the various stations of the metal forming dies. Various tools and/or components are normally mounted on these die plates to achieve the desired forming of the metal stock and/or advancement through the die. These pairs of metal plates are typically interconnected by guide pins, which serve not only to accurately align each plate in the pair for precise reciprocation, but also act as a retainer to positively limit to a predetermined amount the distance each pair of plates may be separated from one another, so as to ensure proper synchronization between the various stations and/or operations being performed in the metal forming die. Examples of such components are stock lifters, guided keepers, pressure plates, die shoes, die set pins, and the like. Consequently, it should be understood that the term "die member," as used herein, refers to any portion of a metal forming die or die set, including, but not limited to, an upper die member or die shoe, a lower die member, all other die components, whether stationary or reciprocating, including a reciprocating pressure pad, or the like. In the example illustrated in FIG. 12, and as discussed above, the guide pin assembly 2 is shown used in conjunction with a guided keeper assembly, wherein the base portion 50 of the guided keeper is operably connected with the second die member 6, by fasteners 60, and the lower end 10 of the guide pin body 8 is operably connected with the first die member 5 by fasteners 70. However, as will be appreciated by those skilled in the art, guide pin assembly 2 can be mounted utilizing different bases 50 or other mounting means. In addition, guide pin assembly 2 can be mounted in other types of die members, and/or components in a variety of different positions and orientations as necessary to manipulate and form the stock strip as it advances through the various work stations of an associated metal forming die.

The illustrated guide pin body 8 has a rigid, one-piece construction, and can be machined from a solid bar or rod of metal or the like, such as steel. The illustrated guide pin body 8 has a flat, circularly shaped upper end 82, and an opposite, generally flat and circular lower end 80. As described above, in the example illustrated in FIGS. 1-3 and 12, the lower end 80 of guide pin body 8 includes an outwardly protruding, central locator pin 76, which is closely received in a mating hole 77 in the first die member 3, as best illustrated in FIG. 12. As will be appreciated by those having ordinary skill in the art, the lower end 80 of guide pin body 8 may be equipped with different types of locator mechanisms so as to ensure proper alignment between guide pin body 8 and the two die members 5, 6. With reference to FIGS. 2, 4-11, the first and second grooves 16, 18 in the illustrated guide pin body 8 have a generally circular cross-sectional shape, that opens radially outwardly. The first and second grooves 16, 18 have a predetermined groove depth. In the illustrated example, the first and second grooves 16, 18 in guide pin body 8 have a cross-sectional shape that is generally semi-circular in configuration, although other shapes and sizes are also contemplated by the present invention. Similarly, the illustrated guide pin head 20 has a rigid, one-piece construction and can be machined from a solid bar or rod of metal or the like, such as steel.

Figure 1:
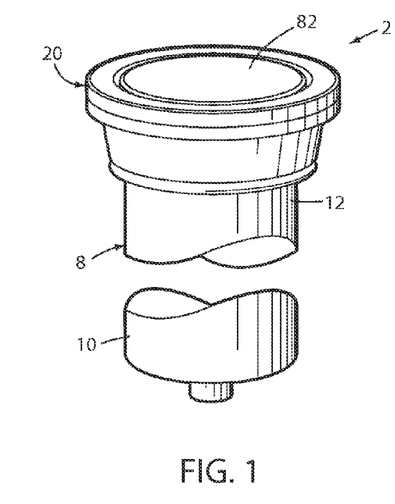
FIG. 1 is a fragmentary perspective view of a guide pin assembly embodying the present invention.
Figure 2:
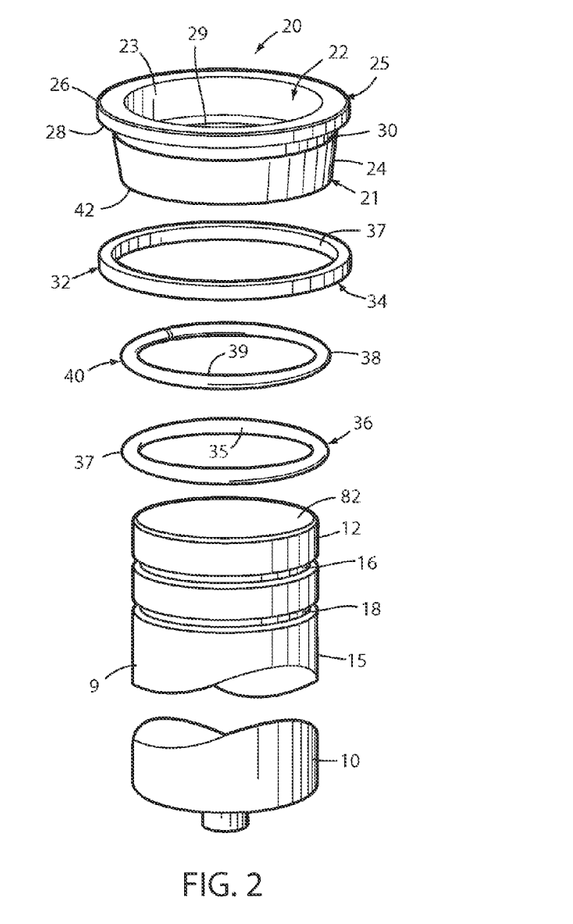
FIG. 2 is an exploded perspective view of the guide pin assembly.

With reference to FIG. 2, the illustrated retainer ring 40 is a split, one-piece, round construction that is made from a single piece of solid spring steel wire, rod, or the like. Retainer ring 40 has a circular lateral cross-sectional body shape, as shown in FIGS. 4, 5-11. The opposite ends of retainer ring 40 are separated by a predetermined amount, preferably in the range of 0.03 inches to 0.10 inches, and the body of retainer ring 40 is resiliently flexible, so that it can expand and contract circumferentially and/or radially, thereby permitting the interior or inward side 39 of retainer ring 40 to be snapped into the first groove 16 in the guide pin body 8. As described above, the retainer ring 40 engages the inside shoulder 29 of the guide pin head 20 to create a strong and durable guide pin assembly 2. The guide pin head 20 can slide or snap over the retainer ring 40 to keep the guide pin head 20 in place. If a second retainer ring is used as discussed above, the second retainer ring may be received in a similar manner in the second groove 18.

The bushing 54 can be any conventional bushing, including a split bushing, as shown in FIG. 12, or a solid bushing. The bushing may be made of any suitable material, including metal. The length of the bushing 54 can change the distance the guide pin assembly 2 travels and therefore the amount that the die members 5, 6 can diverge. Similarly, the depth of the aperture 14 in the die member 6, and the length of fasteners 70 can affect how far the die members 5, 6 diverge. Therefore, these factors, as well as the length of the guide pin body 8, can be adjusted depending upon the application and/or die 4. While the illustrated embodiments show the use of a bushing 54 within the base 50, the base 50 may be machined to closely receive the guide pin body assembly 2 such that a bushing 54 is not needed.

As illustrated in FIG. 5, when the die members 5, 6 diverge, the directional force of the guide pin assembly 2 is shown by arrow D. The tapered surfaces 24, 52 permit the directional force to travel outwardly, shown by arrows O, to the surrounding mounting components. This allows the die member 6 and the base 50 to provide support for the guide pin head 20, as shown by arrows S in FIG. 8. Thus, the tapered design provides a dampening feature while also diverting the directional force D to prevent the shearing of the guide pin head 20 from the guide pin body 8.

Figure 6:
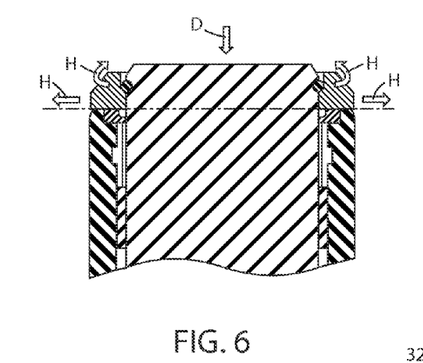
FIG. 6 is a fragmentary cross-sectional view of a prior art guide retainer, with a dashed line showing the retention area and arrows showing the directional force.

A prior art design is shown in FIG. 6. In contrast to the present invention, the directional force D is not transferred and instead subjects the prior art head to higher forces, as shown by arrows H. This can result in the shearing of the head. Also, the cross-sectional retention area, shown in dashed lines in FIGS. 6 and 7, is comparatively lower and larger in the present invention (FIG. 7) given the tapered design.

Figure 9:
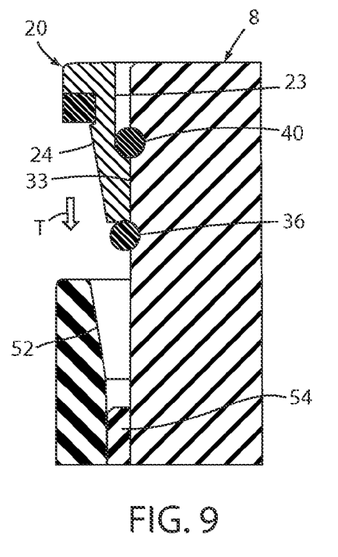
FIG. 9 is an enlarged fragmentary cross-sectional view of the guide pin assembly before the guide pin head has contacted the base.

As illustrated in FIGS. 9-11, multiple dampening components are present in the inventive design. FIG. 9 illustrates the guide pin assembly 2 before the guide pin head 20 has contacted the base 50. The arrow T in FIG. 9 illustrates the direction of travel. FIG. 10 illustrates the guide pin assembly 2 as there is initial contact between the guide pin head 20 and the base 50 and bushing 54. FIG. 11 illustrates complete contact between the guide pin head 20 and the base 50 and bushing 54. As shown in FIG. 11, the O-rings 32, 36 can become compressed. Thus, the inventive design permits dampening through both O-rings and the tapered interfaces 24, 52 between the guide pin head 20 and base 50.

Guide pin assembly 2 has an uncomplicated construction which is economical to manufacture, very strong, and durable during use. Designed interferences between the various parts of the guide pin assembly 2 provide a secure locking function when the parts are fully assembled. The guide pin assembly 2 also includes a number of dampening features, including the tapered head and the O-rings.

In the foregoing description, it will be readily appreciated by those skilled in the art that modifications may be made to the invention without departing from the concepts disclosed herein, such modifications are to be considered as included in the following claims, unless these claims by their language expressly state otherwise.

The invention claimed is:

1. A guide pin assembly for metal forming dies having first and second die members which mutually converge and diverge to form metal parts, comprising:
   a guide pin body having a generally cylindrical shape, including:
      a first end portion configured for secure operable attachment with the first die member;
      a second end portion disposed generally opposite said first end portion, and configured to be received into an associated aperture in the second die member;
      a medial portion disposed between said first and second end portions, and having a generally hard, smooth finished exterior surface for precisely guiding the converging and diverging motion between the first and second die members;
a first groove extending circumferentially about said exterior surface at an axial location disposed generally adjacent to said second end portion of said guide pin body, and having a generally arcuate shape that opens radially outwardly;
a guide pin head including:
a first end portion with a tapered outer sidewall;
a second end portion with a first generally cylindrical outer sidewall having a first diameter and a second generally cylindrical sidewall having a second diameter that is larger than the first diameter, such that an annular shoulder is formed on the outside of the second end portion;
an aperture that extends through the guide pin head, having a first generally cylindrical inner sidewall having a first diameter and a second generally cylindrical sidewall having a second diameter that is greater than the first diameter, such that an annular shoulder is formed on the inside of the guide pin head;
a groove extending circumferentially about the exterior surface of the first generally cylindrical outer sidewall of the second end portion of the guide pin head; and
a retainer ring closely received and retained in said first groove in said guide pin body, that contacts said annular shoulder on the inside of the guide pin head to retain the guide pin head on the guide pin body.

2. A guide pin assembly as set forth in claim 1, including:
a second groove extending circumferentially about said exterior surface of the guide pin body at an axial location disposed between the medial portion and said first groove, and having a generally arcuate shape that opens radially outwardly.

3. A guide pin assembly as set forth in claim 2, including:
a second retainer ring closely received in said second groove in said guide pin body to contact a surface of said guide pin head.

4. A guide pin assembly as set forth in claim 2, including:
a first elastomeric O-ring closely received in said second groove in said guide pin body to dampen the impact between said guide pin head and a bushing located within a base that secures said guide pin assembly to said second die member when said die members diverge.

5. A guide pin assembly as set forth in claim 4, including:
a second elastomeric O-ring closely received in said groove on the exterior of said guide pin head to dampen the impact between said annular shoulder on the outside of said guide pin head and said base when said die members diverge.

6. A guide pin assembly as set forth in claim 5, wherein:
a second elastomeric O-ring has a generally rectangular cross section.

7. A guide pin assembly as set forth in claim 6, wherein:
said first and second O-rings are made of rubber.

8. A guide pin assembly as set forth in claim 1, wherein:
said retainer ring is a metal C-ring.

9. A guide pin assembly as set forth in claim 3, wherein:
said base has a tapered inner surface that generally coincides with said tapered surface on said guide pin head such that the tapered surfaces contact when said die members diverge.

10. In a metal forming die having first and second die members which mutually converge and diverge to form metal parts, the improvement of a guide pin assembly, comprising:
a guide pin body having a generally cylindrical shape, including:
a first end portion configured for secure operable attachment with the first die member;
a second end portion disposed generally opposite said first end portion, and configured to be received into an associated aperture in the second die member;
a medial portion disposed between said first and second end portions, and having a generally hard, smooth finished exterior surface for precisely guiding the converging and diverging motion between the first and second die members;
a first groove extending circumferentially about said exterior surface at an axial location disposed generally adjacent to said second end portion of said guide pin body, and having a generally arcuate shape that opens radially outwardly;
a guide pin head including:
a first end portion with a tapered outer sidewall;
a second end portion with a first generally cylindrical outer sidewall having a first diameter and a second generally cylindrical sidewall having a second diameter that is larger than the first diameter, such that an annular shoulder is formed on the outside of the second end portion;
an aperture that extends through the guide pin head, having a first generally cylindrical inner sidewall having a first diameter and a second generally cylindrical sidewall having a second diameter that is greater than the first diameter, such that an annular shoulder is formed on the inside of the guide pin head;
a groove extending circumferentially about the exterior surface of the first generally cylindrical outer sidewall of the second end portion of the guide pin head; and
a retainer ring closely received and retained in said first groove in said guide pin body, that contacts said annular shoulder on the inside of the guide pin head.

11. A metal forming die as set forth in claim 10, including:
a second groove extending circumferentially about said exterior surface of the guide pin body at an axial location disposed between the medial portion and said first groove, and having a generally arcuate shape that opens radially outwardly.

12. A metal forming die as set forth in claim 11, including:
a first elastomeric O-ring closely received in said second groove in said guide pin body to dampen the impact between said guide pin head and a bushing located within a base that secures said guide pin assembly to said second die member when said die members diverge.

13. A metal forming die as set forth in claim 12, including:
a second elastomeric O-ring closely received in said groove on the exterior of said guide pin head to dampen the impact between said annular shoulder on the outside of said guide pin head and said base when said die members diverge.

14. A metal forming die as set forth in claim 13, wherein:
said base has a tapered inner surface that generally coincides with said tapered surface on said guide pin head such that the tapered surfaces contact when said die members diverge.

15. A method for making a guide pin assembly for metal forming dies of the type having first and second die members which mutually converge and diverge to form metal parts, comprising:
forming a guide pin body having a generally cylindrical shape, including:

a first end portion configured for secure operable attachment with the first die member;
a second end portion disposed generally opposite said first end portion, and configured to be received into an associated aperture in the second die member;
a medial portion disposed between said first and second end portions, and having a generally hard, smooth finished exterior surface for precisely guiding the converging and diverging motion between the first and second die members;
a first groove extending circumferentially about said exterior surface at an axial location disposed generally adjacent to said second end portion of said guide pin body, and having a generally arcuate shape that opens radially outwardly;
forming a guide pin head including:
a first end portion with a tapered outer sidewall;
a second end portion with a first generally cylindrical outer sidewall having a first diameter and a second generally cylindrical sidewall having a second diameter that is larger than the first diameter, such that an annular shoulder is formed on the outside of the second end portion;
an aperture that extends through the guide pin head, having a first generally cylindrical inner sidewall having a first diameter and a second generally cylindrical sidewall having a second diameter that is greater than the first diameter, such that an annular shoulder is formed on the inside of the guide pin head;
a groove extending circumferentially about the exterior surface of the first generally cylindrical outer sidewall of the second end portion of the guide pin head; and
providing a retainer ring to be closely received and retained in said first groove in said guide pin body; and
sliding the guide pin head over the guide pin body and the retainer ring such that guide pin head is retained on the guide pin body.

16. A method as set forth in claim 15, wherein:
said retainer ring providing step includes selecting a split C-ring having a generally circular radial cross-sectional shape.

17. A method as set forth in claim 15, wherein:
the guide pin body forming step includes forming a second groove extending circumferentially about said exterior surface of the guide pin body at an axial location disposed between the medial portion and said first groove, having a generally arcuate shape that opens radially outwardly.

18. A method as set forth in claim 17, including:
providing a first elastomeric O-ring to be closely received in said second groove in said guide pin body to dampen the impact between said guide pin head and a bushing located within a base that secures said guide pin assembly to said second die member when said die members diverge.

19. A method as set forth in claim 18, including:
providing a second elastomeric O-ring to be closely received in said groove on the exterior of said guide pin head to dampen the impact between said annular shoulder on the outside of said guide pin head and said base when said die members diverge.

20. A method as set forth in claim 19, including:
forming said base with a tapered inner surface that generally coincides with said tapered surface on said guide pin head such that the tapered surfaces contact when said die members diverge.

* * * * *